United States Patent
Fradette, II

(10) Patent No.: US 6,701,873 B2
(45) Date of Patent: Mar. 9, 2004

(54) DOUBLE DOG RUN AND LEASH

(76) Inventor: Francis X. Fradette, II, P.O. Box 1231, Middletown Springs, VT (US) 05757

( * ) Notice: Subject to any disclaimer, the term of this patent is extended or adjusted under 35 U.S.C. 154(b) by 0 days.

(21) Appl. No.: 10/158,802

(22) Filed: Jun. 3, 2002

(65) Prior Publication Data

US 2003/0221635 A1 Dec. 4, 2003

(51) Int. Cl.[7] ............................................... A01K 1/06
(52) U.S. Cl. .................................................... 119/784
(58) Field of Search ................................ 119/784, 792, 119/795, 785, 771

(56) References Cited

U.S. PATENT DOCUMENTS

| | | | |
|---|---|---|---|
| 78,631 A | * | 6/1868 | Wilkinson .................. 119/785 |
| 225,404 A | | 3/1880 | Maxey |
| 274,462 A | * | 3/1883 | Christopher et al. ......... 119/785 |
| 336,295 A | * | 2/1886 | Coleman .................... 119/785 |
| 819,561 A | * | 5/1906 | Laws ........................ 119/785 |
| 1,563,212 A | | 11/1925 | Madiar |
| 3,395,675 A | | 8/1968 | Fowlkes |
| 3,722,478 A | | 3/1973 | Smith |
| 4,667,625 A | | 5/1987 | Malone |
| 4,747,372 A | * | 5/1988 | Terry et al. ................ 119/782 |
| 5,103,771 A | * | 4/1992 | Lee ........................... 119/776 |
| 5,213,063 A | | 5/1993 | Franck, III |
| D346,047 S | | 4/1994 | Peterson |
| 5,339,773 A | | 8/1994 | Van Druff |
| 5,497,732 A | | 3/1996 | Moffre et al. |
| 5,505,162 A | | 4/1996 | Fleischer et al. |
| 5,551,379 A | * | 9/1996 | Hart .......................... 119/771 |
| 5,718,190 A | | 2/1998 | Tinker |
| 5,724,921 A | * | 3/1998 | Bell .......................... 119/795 |
| 5,749,325 A | * | 5/1998 | Albanese ................... 119/792 |
| 5,901,668 A | * | 5/1999 | Goodger, Sr. ............... 119/795 |
| 6,029,611 A | * | 2/2000 | Hershauer .................. 119/771 |
| 6,047,665 A | * | 4/2000 | Deveaux .................... 119/770 |
| 6,237,539 B1 | | 5/2001 | Sporn |
| 6,427,374 B1 | * | 8/2002 | Vaiani ........................ 42/85 |
| 6,439,168 B1 | * | 8/2002 | Maglich et al. ............. 119/795 |
| 6,467,437 B2 | * | 10/2002 | Donovan et al. ........... 119/798 |

FOREIGN PATENT DOCUMENTS

GB    2060344 A    5/1981

* cited by examiner

*Primary Examiner*—Charles T. Jordan
(74) *Attorney, Agent, or Firm*—Richard C. Litman

(57) ABSTRACT

A dog run and apparatus adapted to accommodate more than one dog. The apparatus includes a spring-tensioned run line. One end of a primary leash line is mounted on the run line via a swivel connection and pulley. One end of a secondary leash line is mounted on the primary leash line via a swivel connection and pulley. A second end of the primary and secondary leash lines is connected to a respective dog's collar. The elevation of the run line above grade and the linear dimensions of the run line and leash lines have been chosen to afford ample run area for the dogs and to provide room for maneuvering without causing the leash lines to tangle and snarl.

1 Claim, 2 Drawing Sheets

DOUBLE DOG RUN AND LEASH

BACKGROUND OF THE INVENTION

1. Field of the Invention

The present invention generally relates to restraining devices. More specifically, the present invention is drawn to apparatus for permitting movement of multiple dogs in a dog run.

2. Description of the Related Art

Because of municipal leash laws, small yards, inadequate fencing, etc., finding adequate exercise space for the pet poodle is often difficult for a dog owner. To alleviate this situation, dog owners commonly rely on so-called dog runs. Dog runs typically utilize a horizontal run line (cable, rope, or wire) strung at some distance above ground and anchored between two supporting objects (trees, posts, etc.). A leash line has one end fastened to the run line for sliding movement thereon. The other end of the leash line is attached to the dog's collar. This scenario allows the dog to move in an area limited by the length of the run line and the leash line. Though this arrangement has proven satisfactory to an extent, problems arise when more than one dog is tethered to the run line. The problems occur when the dogs run over, under and around each other causing entanglements and snarls which might lead to injury. Apparatus to prevent such entanglements and snarls would certainly be a welcome addition to the art.

U.S. Pat. Nos. Des. 346,047 (Peterson), 225,404 (Maxey), 1,563,212 (Madir), 3,395,675 (Fowlkes), 3,722,478 (Smith), 5,497,732 (Moffre et al.) and 5,505,162 (Fleisher et al.) are examples of dog run apparatus designed to accommodate a single dog. It is noted that none of the above patents employ a combination of pulleys and swivels.

British Patent Application numbered 2,060,344 (Dubrey) and U.S. Pat. No. 5,213,063 (Franck, III) disclose a dog run apparatus for a single dog. Both references show utilization of a pulley and swivel combination only at the run line.

The use of a pulley and shock absorber is disclosed in U.S. Pat. No. 4,667,625 (Malone). There appears to be no contemplation for combining a swivel with the pulley.

U.S. Pat. No. 5,718,190 (Tinker) shows apparatus utilized to tether dogs on a pick-up truck bed. The apparatus does not include pulleys or swivels.

U.S. Pat. No. 5,339,773 (Van Druff) utilizes a movable trolley mounted on a track for tethering animals. The track is attached to a solid surface. The instant apparatus does not include a run line and pulleys.

U.S. Pat. No. 6,237,539 B1 (Sporn) discloses a leash equipped to control at least two dogs. The leash does not require pulleys or swivels.

None of the above inventions and patents, taken either singularly or in combination, is seen to disclose a dog run and leash system as will be subsequently described and claimed in the instant invention.

SUMMARY OF THE INVENTION

The instant invention comprises a dog run and apparatus adapted to accommodate more than one dog. The apparatus includes a spring-tensioned run line. One end of a primary leash line is mounted on the run line via a swivel connection and pulley. One end of a secondary leash line is mounted on the primary leash line via a swivel connection and pulley. A second end of the primary and secondary leash lines is connected to a respective dog's collar. The elevation of the run line above grade and the linear dimensions of the run line and leash lines have been chosen to afford ample run area for the dogs and to provide room for maneuvering without causing the leash lines to tangle and snarl.

Accordingly, it is a principal object of the invention to provide a tethering apparatus, which apparatus allows a dog to have a wide range of movement.

It is another object of the invention to provide a tethering apparatus, which apparatus can accommodate more than one dog at a time.

It is a further object of the invention to provide a tethering apparatus, which apparatus is not susceptible to entanglements and snarls.

Still another object of the invention is to provide a tethering apparatus, which apparatus is safe for dogs of all sizes.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
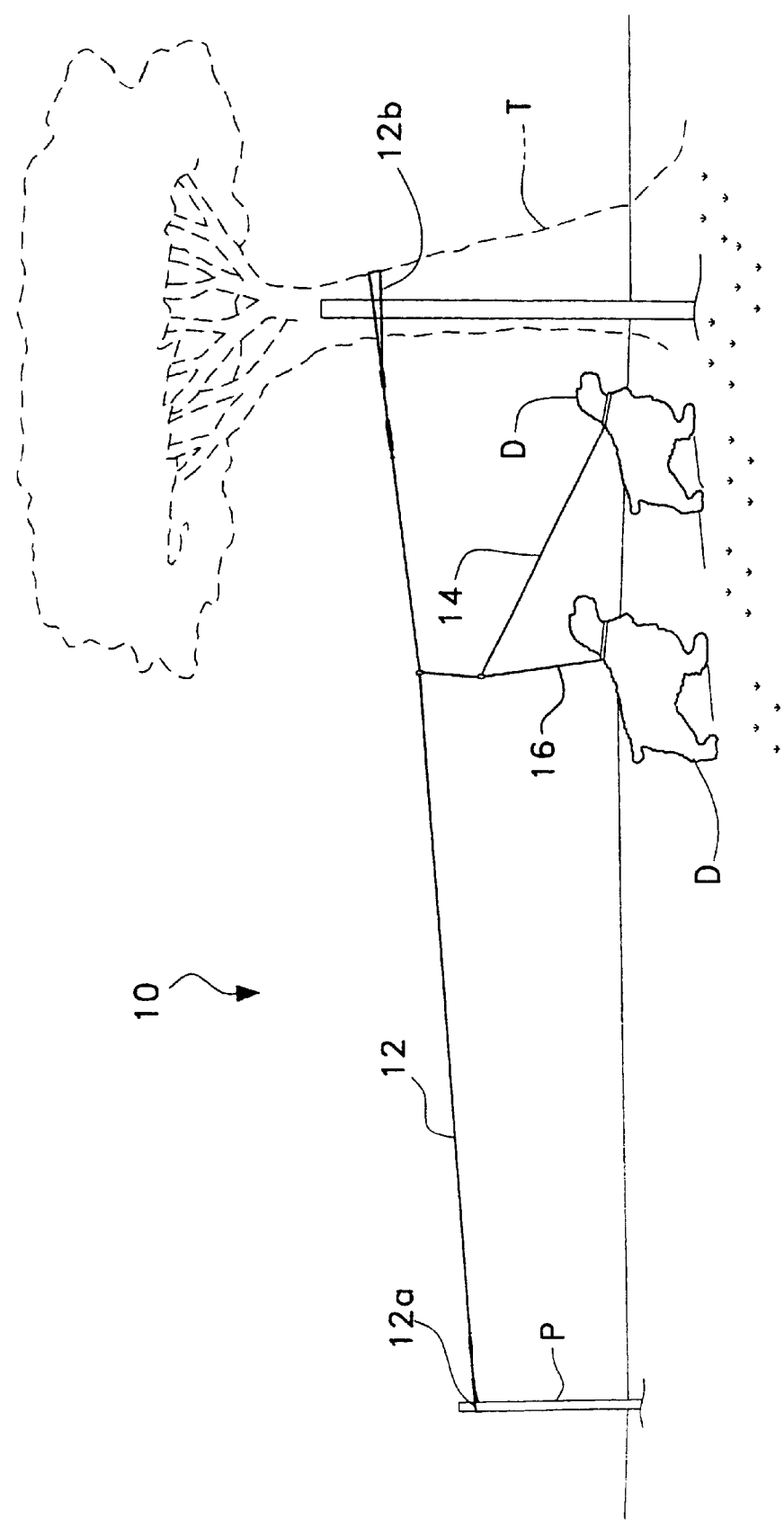
FIG. 1 is an environmental, perspective view of a dog run and leash according to the present invention.

Attention is first directed to FIG. 1 wherein the dog run of the present invention is generally indicated at 10. Run 10 comprises a run line 12 having ends 12a, 12b secured to supporting structure such as four-by-four posts P or alternatively to a natural support such as a tree T (shown in phantom lines). Posts P are anchored in the ground with concrete or the like to insure stability. For optimum operation, run line 12 must be elevated at least six feet above ground level and the usable length of the line should be between fifty and one-hundred feet. As shown, two dogs D are leashed to run line 12 via primary and secondary leashes 14 and 16. Although only two dogs are shown, it should be recognized that the run area could be partitioned or zoned to accommodate at least another pair of dogs. Run line 12 is mounted so that it may sway approximately two feet in a horizontal plane.

Figure 2:
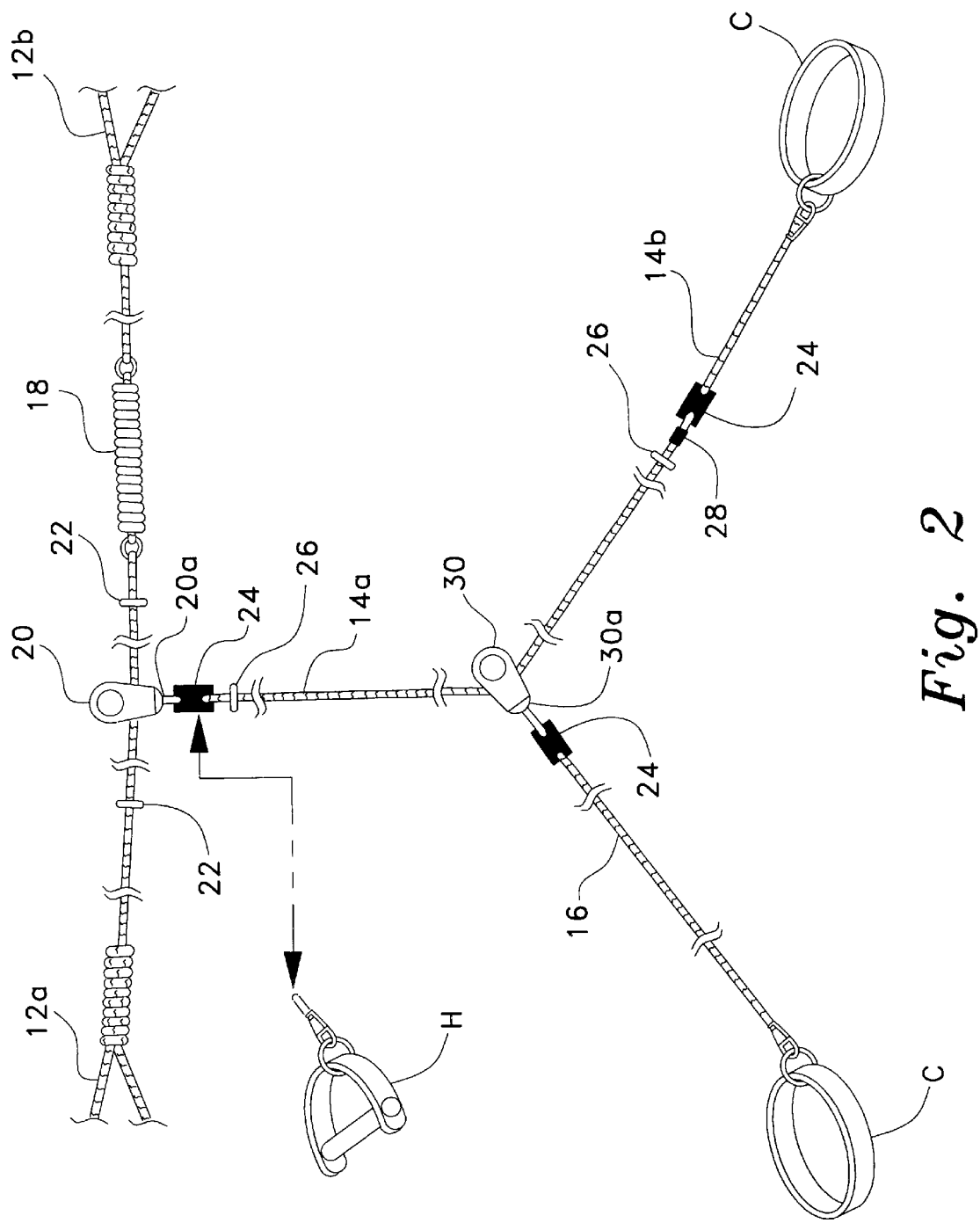
FIG. 2 is a partial view illustrating details of a run line and leash arrangement according to the present invention.

Attention is now directed to FIG. 2 wherein a spring tension member 18 is positioned adjacent one end of run line 12. Tension member 18 will permit line 12 to give in both horizontal and vertical planes to enhance safety and comfort. A first pulley 20 is mounted to freely slide on run line 12. A swivel member 20a is incorporated in the lower end of pulley 20. Swivel member 20a can freely rotate through three-hundred-sixty degrees.

A pulley stop 22 is disposed adjacent each end of run line 12. The usable length of run line is positioned between the pulley stops 22. As noted above, this usable length should be between fifty and one hundred feet. A quick-connect mechanism 24 is employed to attach and detach the primary leash at swivel member 20*a*. Pulley stops 26 define a first segment 14*a* of primary leash 14. The first segment should have a length of between six feet and eight feet. A three-hundred-sixty degree swivel member 28 defines an end of a second segment 14*b* of primary leash 14. The second segment is approximately two feet in length and terminates in a collar C for a first dog. Segment 14*b* is provided with a quick-connect mechanism 24. Secondary leash 16 is attached via a quick-connect mechanism 24 to swivel member 30*a* and second pulley 30. Pulley 30 slides freely on segment 14*a* between stops 26. The secondary leash 16 is at least three feet in length and terminates in a collar C for a second dog. A handle H may be provided for attachment at an appropriate quick-connect mechanism on the primary and/or secondary leashes to walk the dogs when the leashes are disconnected from the run.

For small-sized dogs, the run line and leash lines should be approximately one-fourth of an inch in diameter and medium-gauge pulleys employed; for medium-sized dogs, three-eighths of in inch and medium-gauge pulleys; and for large-sized dogs, one-half of an inch and heavy-gauge pulleys. The pulley and swivel system of the above arrangement work together so that dogs can go over, under and around each other without causing potentially harmful snarl and entanglements in the primary and secondary leashes. Care should be taken to remove all obstacles in the run area (shrubs, stumps, dog houses, etc.) and to keep all parts of the apparatus in good working order.

It is to be understood that the present invention is not limited to the embodiment described above, but encompasses any and all embodiments within the scope of the following claims.

I claim:

1. A dog run and leash system including:

a run line defining a path of travel therealong, said run line having a first end and a second end, the path of travel of said run un having a length of between fifty and one hundred feet;

structure for supporting said run line in an elevated position of at least six feet above ground level;

a first pulley, said first pulley disposed on said run line and having free movement along said path of travel;

a first swivel member, said first swivel member mounted on said first pulley;

a primary leash line defining a path of travel therealong, said primary leash having a proximate end and a distal end, the proximate end of said primary leash line being attached to said first swivel member;

a second pulley, said second pulley disposed on said primary leash line and having free movement along said path of travel defined on said primary leash line;

a secondary leash line, said secondary leash line having a proximate end and a distal end;

a second swivel member, said second swivel member mounted on said second pulley, wherein the proximate end of said secondary leash line is attached to said second swivel member;

a spring-tension member, said spring-tension member disposed adjacent said first end of said run line;

a first pair of pulley stops, each one of said first pair respectively disposed on said run line adjacent said first end and said second end;

a second pair of pulley stops, said second pair of pulley stops being spaced apart on said primary leash line, whereby to define the path of travel on said primary leash line;

a first quick-connect member, wherein said first quick-connect member attaches said proximate end of said primary leash line to said first swivel member;

a second quick-connect member wherein said second quick-connect member attaches the proximate end of said secondary leash line to said second swivel member; and wherein said primary leash line includes a first segment having a length of between six and eight feet and a second segment having a length of approximately two feet, and wherein a third swivel member rotatable through three hundred sixty degrees connects said first segment to said second segment.

* * * * *